(12) United States Patent
Ishida

(10) Patent No.: US 7,148,595 B2
(45) Date of Patent: Dec. 12, 2006

(54) VEHICULAR ALTERNATOR

(75) Inventor: Hiroshi Ishida, Anjo (JP)

(73) Assignee: Denso Corporation, Kariya (JP)

( * ) Notice: Subject to any disclaimer, the term of this patent is extended or adjusted under 35 U.S.C. 154(b) by 252 days.

(21) Appl. No.: 10/974,706

(22) Filed: Oct. 28, 2004

(65) Prior Publication Data

US 2005/0093384 A1  May 5, 2005

(30) Foreign Application Priority Data

Nov. 4, 2003 (JP) ............................... 2003-373884

(51) Int. Cl.
*H02K 5/10* (2006.01)
*H02K 5/20* (2006.01)

(52) U.S. Cl. ..................... 310/88; 310/58; 310/62; 310/89

(58) Field of Classification Search ................ 310/58, 310/62, 85, 88, 89
See application file for complete search history.

(56) References Cited

U.S. PATENT DOCUMENTS

| | | | | |
|---|---|---|---|---|
| 2,464,221 A | * | 3/1949 | Elks ........................... | 310/62 |
| 3,017,526 A | * | 1/1962 | Luenberger ............... | 310/60 R |
| 5,076,762 A | | 12/1991 | Lykes et al. .................. | 310/59 |
| 5,182,482 A | * | 1/1993 | Burke ......................... | 310/89 |
| 5,650,675 A | * | 7/1997 | Kanaya et al. ............... | 310/58 |
| 5,742,108 A | * | 4/1998 | Kuribayashi et al. ......... | 310/89 |
| 6,040,645 A | | 3/2000 | Lynch .......................... | 310/58 |
| 6,750,578 B1 | * | 6/2004 | Buening et al. .............. | 310/89 |
| 6,888,275 B1 | * | 5/2005 | Nakano ....................... | 310/89 |

FOREIGN PATENT DOCUMENTS

FR  2 745 440  8/1997
JP  08-037748 A  2/1996

OTHER PUBLICATIONS

N. Shioya, "Vehicular Alternating Current Electric Power Generator"; Technical Bulletin of Japan Institute of Invention and Innovation, JP 2001-4939; Sep. 3, 2001 (w/ partial English translation).
Y. Shoji, "Vehicular Alternating Current Electric Power Generator"; Technical Bulleting of Japan Institute of Invention and Innovation, JP 2001-5270; Sep. 17, 2001 (w/ partial English translation).

* cited by examiner

*Primary Examiner*—Burton Mullins
(74) *Attorney, Agent, or Firm*—Oliff & Berridge, PLC

(57) ABSTRACT

A vehicular alternator 1 is disclosed as having a stator 2 on which an armature winding 21 is wound, a rotor 3 rotatably disposed in the stator, cooling fans 32, 33 for creating cooling winds during rotation of the rotor, a front housing 41 and a rear housing 45 with which the stator and the rotor are supported and having side areas formed with cooling wind discharge windows 42, 46, and a waterproof cover 8 located over an outer peripheral sides of the housings 41, 45. The waterproof cover 8 has a plurality of ventilation apertures 81 formed at an inclined angle different from an inclined angle at which the cooling wind discharge windows are formed.

11 Claims, 4 Drawing Sheets

VEHICULAR ALTERNATOR

CROSS REFERENCE TO RELATED APPLICATIONS

This application is related to Japanese Patent Application No. 2003-373884 filed on Nov. 4, 2003, the content of which is hereby incorporated by reference.

BACKGROUND OF THE INVENTION

1. Field of the Invention

The present invention relates to electric power generators for use in vehicles and, more particularly, to a vehicular alternator adapted to be installed on an automobile and a truck, etc.

2. Description of the Related Art

In general, a typical example of vehicular alternators known in the art includes a housing with which a stator is supported to rotatably accommodate therein a rotor that carries cooling fans for rotation with the rotor to create a cooling wind that is discharged through discharge windows formed in the housing (see Japanese Patent Provisional Publication No. 8-37748 (on pages 4to 9 and in FIGS. 1 to 8). With such a related art vehicular alternator, probabilities occur wherein with a vehicle traveling on unpaved roads, muddy water, splashed by tires during traveling of the vehicle, enters an engine room and penetrates an interior of the vehicular alternator through the discharge windows formed in the housing, facilitating corrosion in component parts. This can result in the penetration of muddy water into brush-sliding areas to cause abnormal wear in a brush with a resultant abnormality in operation to generate electric power. For countermeasures against such an issue, the simplest technique has been proposed to provide a waterproof cover by which the vehicular alternator is covered to enhance waterproof properties (see Invention-Association Laid-Open Publication No. 2001-004939 (on Page 1 and in FIGS. 1 and 2).

Also note that in cases where the waterproof cover is mounted onto the vehicular alternator so as to cover the same, cooling wind discharged from the discharge windows of the housing hits the waterproof cover and increases ventilation resistance of the cooling wind, resulting in deterioration in cooling property.

SUMMARY OF THE INVENTION

The present invention has been completed with the above view in mind and has an object to provide a vehicular alternator that is able to prevent deterioration in cooling performance while enhancing waterproof properties.

To address the above issue, one aspect of the present invention provides a vehicular alternator for use in a vehicle, which comprises a stator on which an armature winding is wound, a rotor rotatably disposed in the stator, a cooling unit mounted to the rotor for creating cooling wind during rotation of the rotor, and a housing with which the stator and the rotor are supported and having a side area formed with a plurality of cooling wind discharge windows, oriented at a first inclined angle with respect to a centrifugal direction about an axis of a rotary shaft of the rotor, to discharge the cooling wind. A waterproof cover is located over an outer circumferential periphery of the side area. The waterproof cover has a plurality of ventilation apertures formed at a second inclined angle different from the first inclined angle with respect to a centrifugal direction about a center of a rotary shaft of the rotor.

With such a structure, the presence of the ventilation apertures formed in the waterproof cover enables the suppression of discharged cooling wind from accumulating inside the waterproof cover for thereby preventing the occurrence of deterioration in cooling performance that would be caused by the waterproof cover located over the outer circumferential periphery of the housing.

Further, due to the presence of a difference between the first inclined angle at which the cooling wind discharge windows are oriented and the second inclined angle at which the ventilation apertures of the waterproof cover are oriented, no probabilities occur for the armature winding to be directly exposed through the openings of the ventilation apertures and the openings of the cooling wind discharge windows as viewed from an outside of the waterproof cover. Thus, muddy water or is the like swiftly penetrated from the outside of the waterproof cover are unable to directly reach the armature winding and favorable waterproof properties can be enhanced.

Furthermore, the ventilation apertures set forth above may be preferably inclined with respect to the centrifugal direction about the center of the rotary shaft of the rotor. This enables the waterproof cover to have enhanced waterproof properties and to have effective soundproof effects to counter noises that would be transferred from the vehicular alternator in a radial direction.

Moreover, the cooling wind discharge windows may be preferably inclined with respect to the centrifugal direction about the center of the rotary shaft of the rotor. This allows the waterproof cover to have enhanced waterproof properties while making it easy to decrease ventilation resistance of a cooling wind flowing in a direction inclined with respect to the centrifugal direction.

In addition, it may be preferable for either one of the inclined angle of the ventilation joles and the inclined angle of the cooling wind discharge windows to lie on the same direction as the rotational direction of the rotor and for the other to lie in an opposite direction. This allows muddy water, penetrating along inclined paths of the ventilation apertures of the waterproof cover, to hit an outer circumferential surface of the housing or side walls of the cooling wind discharge windows to prevent muddy water from directly reaching the armature winding in a highly reliable manner, resulting in further improvements in the waterproof properties of the waterproof cover.

Besides, the waterproof cover set forth above may be preferably mounted to the vehicle together with the housing at a vehicle mount section of the housing. This enables a fixing structure of the waterproof cover to be simplified and, also, it becomes possible for the waterproof cover to have a structure that can be firmly fastened to the vehicle through the use of bolts, through which the vehicular alternator is mounted onto the vehicle, for thereby providing excellent shockproof property against vehicle oscillations.

Additionally, the waterproof cover set forth above may be preferably formed of plastic resin member that includes insert molded metallic members through which the waterproof cover is mounted to the vehicle. This allows the prevention of the plastic resin member of the vehicle mount section from creeping, thereby realizing a structure that has further excellent shockproof properties against vehicle oscillations.

According to another aspect of the present invention, there is provided a vehicular alternator for use in a vehicle, which comprises stator means on which a winding is wound, a rotor rotatably disposed in the stator means, and a cooling wind generating means for creating a cooling wind during rotation of the rotor. A housing means supports the stator means and the rotor and has a side area formed with a plurality of cooling wind discharge windows, oriented at a first inclined angle with respect to a centrifugal direction about an axis of a rotary shaft of the rotor, to discharge the cooling wind. A waterproof cover is located over an outer circumferential periphery of the side area and has a plurality of ventilation apertures formed at a second inclined angle different from the first inclined angle.

BRIEF DESCRIPTION OF THE DRAWINGS

For a better understanding of the present invention and to show how the same may be carried into effect, there will now be described by way of example only, specific embodiments according to the present invention with reference to the accompanying drawings, in which.

DETAILED DESCRIPTION OF THE PREFERRED EMBODIMENTS

Hereinafter, a vehicular alternator of one embodiment according to the present invention will be described below with reference to the accompanying drawings.

Figure 1:
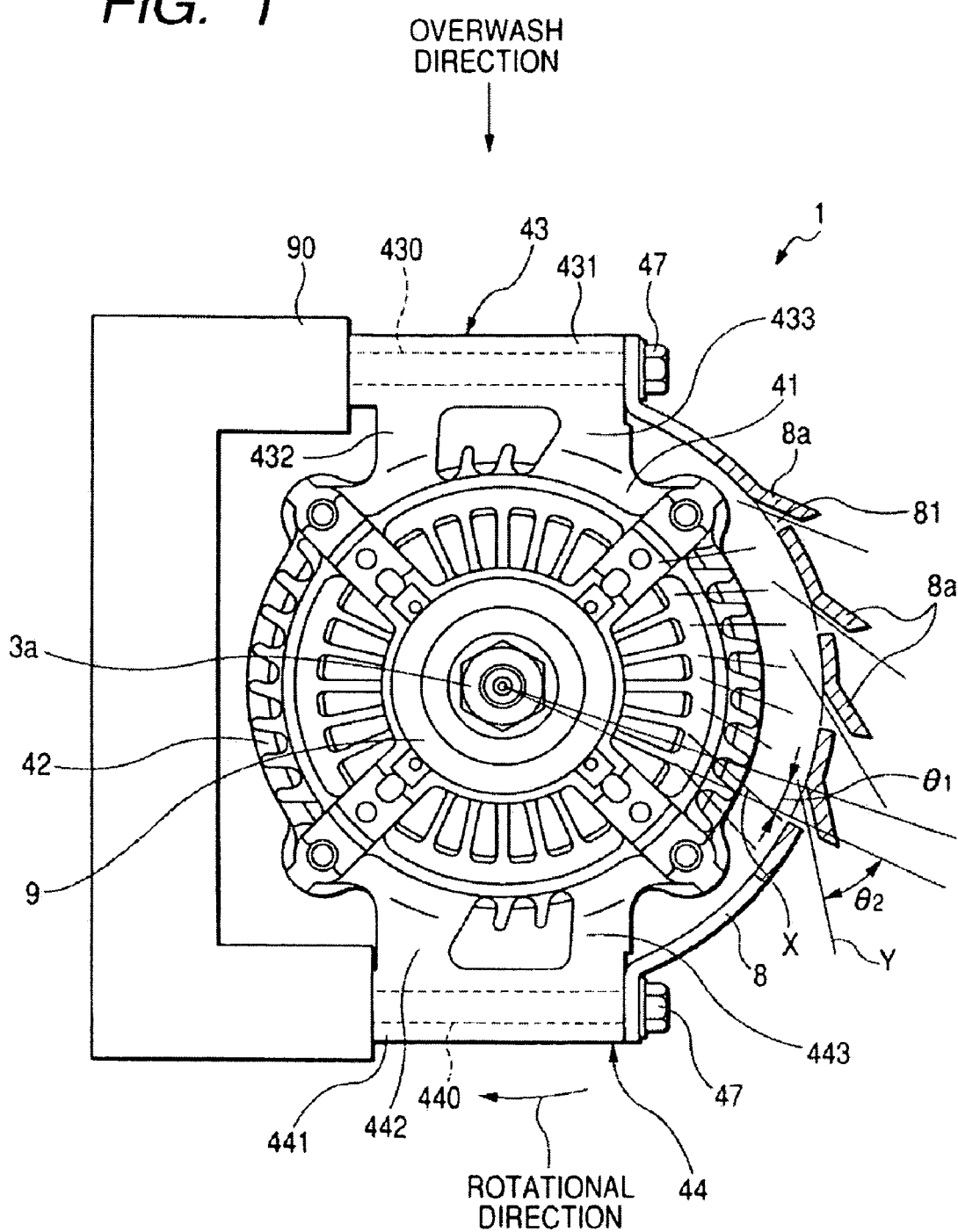
FIG. 1 is a front view of a vehicular alternator, serving as an alternator, of one embodiment according to the present invention.
Figure 2:
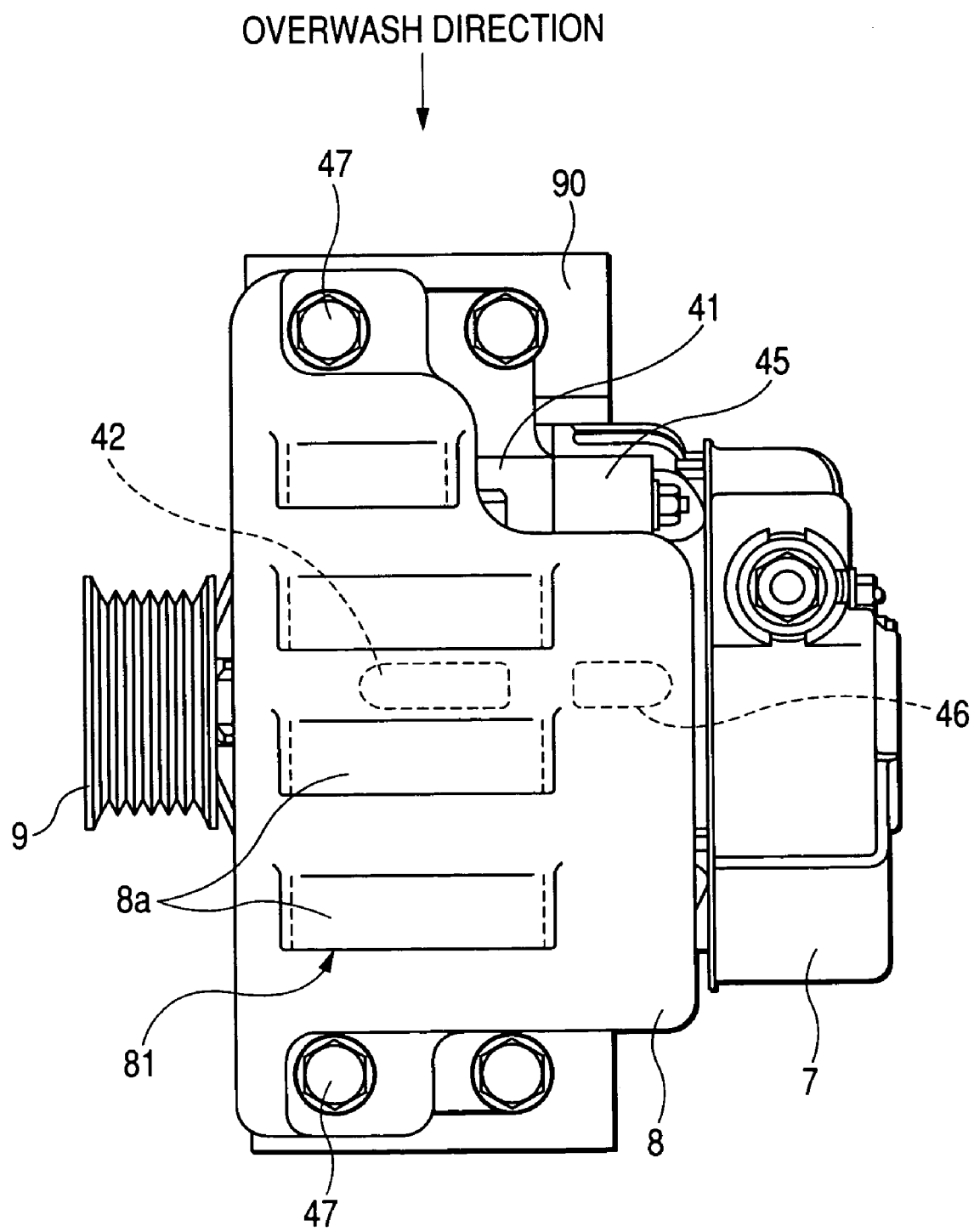
FIG. 2 is a side view of the vehicular alternator of the presently filed embodiment.
Figure 3:
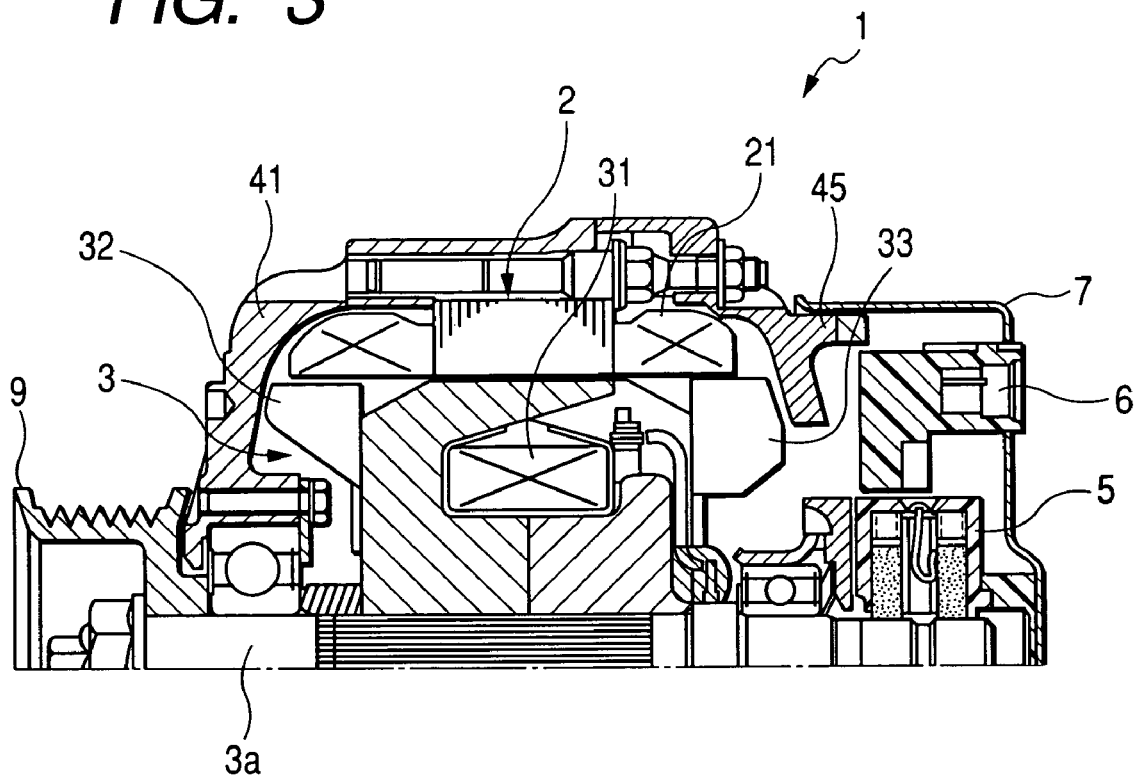
FIG. 3 is a partial cross sectional view of the vehicular alternator of the presently filed embodiment.

FIG. 1 is a front view of an alternator forming a vehicular alternator of one embodiment according to the present invention. Also, FIG. 2 is a side view of the vehicular alternator of the presently filed embodiment. FIG. 3 is a cross sectional view of part of the vehicular alternator of the presently filed embodiment.

As shown in FIGS. 1 to 3, the vehicular alternator 1 of the presently filed embodiment takes a form of a side-mount structure that allows the vehicular alternator 1 to be mounted onto and tightened to an engine bracket 90 on a plane perpendicular to a rotary shaft 3a. The vehicular alternator 1 is comprised of a stator 2 on which an armature winding 21 is wound, a rotor 3 on which a field winding 31 is wound in an area inside the stator 2, cooling fans 32, 33 fixedly secured to both ends of the rotor 3 for rotation therewith to serve as cooling wind generator means to create cooling winds, a front housing 41 and a rear housing 45 axially spaced from one another in concentric relation to support the stator 2 and the rotor 3, a brush unit 5 through which electric power is supplied to the field winding 31, a voltage control device 3 with which output voltage is controlled at a given value, a rear cover 7 by which electric component parts, such as the brush unit 5 and the voltage control device 6, are covered to protect these component parts from extraneous materials, a waterproof cover 8 located over outer circumferential peripheries of the front housing 41 and the rear housing 45, and a pulley 9 connected to a rotor shaft 3a to transmit rotational drive power, delivered from an engine, to the rotor 3.

The front housing 41 has one side periphery formed with a plurality of cooling wind discharge windows 42. These cooling wind discharge windows 42 serve to discharge a cooling wind, occurring in a centrifugal direction during rotation of the cooling fan 32 on a side closer to the pulley 9, to an outside of the front housing 41 and are oriented in a direction X at an inclined angle of θ1 (at a first inclined angle) in a rotational direction with respect to a centrifugal direction about an axis of the rotor shaft 3a of the rotor 3. Further, formed on the front housing 41 are mount stays 43, 44, protruding in parallel to one another, between which the rotor shaft 3a axially extends. The mount stays 43, 44 form a mount section 431 that is formed with bolt insertion bores 430, 440, serving as mounting bores extending perpendicular to the axis of the rotor shaft 3a of the rotor 3, and includes bifurcated legs 432, 433 through which both ends of the mount section 431 are interconnected to a front housing body. Likewise, the mount stay 44 forms a vehicle mount section 441, which is formed with bolt insertion bores 440, serving as mounting bores extending perpendicular to the axis of the rotor shaft 3a of the rotor 3, and includes bifurcated legs 442, 443 through which both ends of the mount section 441 are interconnected to the front housing body.

Further, the rear housing 45 has one side periphery formed with a plurality of cooling wind discharge windows 46. These cooling wind discharge windows 46 serve to discharge a cooling wind, occurring in the centrifugal direction during rotation of the cooling fan 33 on a side closer to the rear cover 7, to an outside of the rear housing 45 and are oriented at the inclined angle of θ1 in the rotational direction with respect to the centrifugal direction.

The waterproof cover 8 covers respective side peripheries of the front housing 41 and the rear housing 45 and has a plurality of ventilation apertures 81, each of which is oriented in a direction Y at an inclined angle of θ2 (a second inclined angle) with respect to the centrifugal direction. The inclined angle θ2 is set to a value different from the inclined angle of θ1 at which the cooling wind discharge windows 42, 46 of the front housing 41 and the rear housing 45 are oriented. Also, with the presently filed embodiment, the waterproof cover 8 has a plurality of partial surfaces formed in an orientation (a direction at the angle of θ2 with respect to the centrifugal direction) differing from a circumferential direction of the waterproof cover 8 to allow the ventilation apertures 81 to be defined in the form of openings opened in the direction Y that is different from a direction in which the waterproof cover 8 is over washed. That is, the waterproof cover 8 has a circumferential area formed with a plurality of ventilation cowls 8a formed with the respective ventilation apertures 81 opened in a direction opposite to a direction in which the waterproof cover 8 is over washed. In other word, each of the cooling wind discharge windows 42, 46 lies on the first direction X oriented at the first inclined angle of θ1 and each of the ventilation apertures 81 lies on the second direction Y oriented at the second inclined angle of θ2. Coincidentally the first and second directions X and Y lie at different angles.

Furthermore, the waterproof cover 8 has a transverse cross sectional surface in the form of a circular arc configuration whose both ends are mounted to a vehicle (through the engine bracket 90) together with the front housing 41 by the use of mount bolts 47 screwed onto the mount stays 43, 44 of the front housing 41. In particular, a layout and a profile of the waterproof cover 8 are designed to provide an ability to cover substantially entire areas of the plural cooling wind discharge windows 42, 46, formed in the front housing 41 and the rear housing 45, respectively, on the same sides thereof with respect to the mount stays 43, 44 as shown in FIG. 2.

Figure 4:
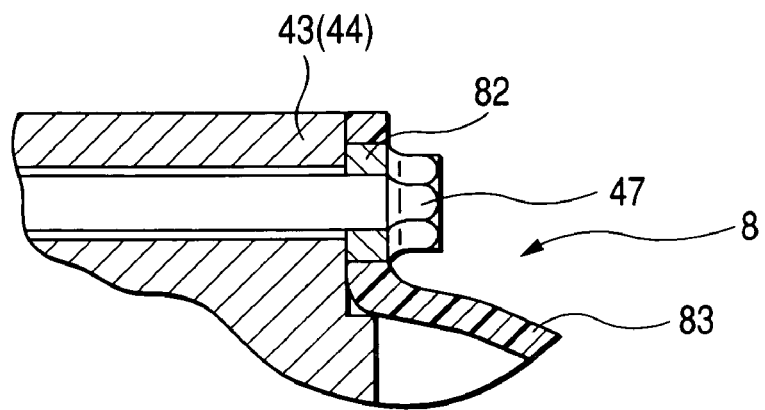
FIG. 4 is a cross sectional view of a waterproof cover located in the vicinity of a mount stay of the vehicular alternator of the presently filed embodiment.

In addition, the waterproof cover 8 is formed of a plastic resin member 83 insert molded with metallic members 82. As shown in FIG. 4, the waterproof cover 8 has at least several areas formed of metallic members 82 that are sandwiched between the mount stays 43, 44 and the bolts 47 and the other remaining area formed of the plastic resin member 83.

Thus, with the waterproof cover 8 formed with the ventilation apertures 81, it becomes possible to prevent the occurrence of deterioration in cooling effects that would be caused by discharged cooling air accumulating in the waterproof cover 8 located over the outer peripheries of the front housing 41 and the rear housing 45. Also, with the presence of a difference between the inclined angle $\theta 1$, at which the cooling wind discharge windows 42, 46 of the front housing 41 and the rear housing 45 are respectively oriented, and the inclined angle $\theta 2$ at which the ventilation apertures 81 of the waterproof cover 8 are oriented, no probabilities occur for the armature winding 21 to be directly exposed through the openings of the ventilation apertures 81 and the openings of the cooling wind discharge windows 42, 46 as viewed from the outside of the waterproof cover 8. This results in a capability of precluding muddy water, splashed by tires and swiftly entering inside from the outside of the waterproof cover 8, from directly reaching the armature winding 21, thereby enhancing favorable waterproof properties.

Moreover, with the waterproof cover 8 formed with the ventilation apertures 81 oriented at the inclined angle with respect to the central direction about a center of the rotary shaft 3a of the rotor 3, waterproof properties of the waterproof cover 8 is enhanced, while making it possible to enable the waterproof cover 8 to have an effective soundproof performance to counter noises generated by the vehicular alternator 1 when it is transferred in a radial direction.

With the cooling wind discharge windows 42, 46, formed in the front housing 41 and the rear housing 45, respectively, which are oriented at the inclined angle with respect to the central direction about the center of the rotary shaft 3a of the rotor 3, waterproof properties of the waterproof cover 8 is enhanced while making it easy to decrease the ventilation resistance of the cooling wind flowing in an inclined direction with respect to the centrifugal direction during rotation of the rotor 3, thereby enabling an improved cooling performance.

Since the waterproof cover 8 is mounted onto the engine bracket 90 together with the front housing 41 by means of the mount stays 43, 44, formed on the front housing 41, through the use of the mount bolts 47, no need arises for a specific fixing structure to be provided, enabling the fixing structure of the waterproof cover 8 to be simplified. Also, using the mount bolts 47, to be used for mounting the vehicular alternator 1 to the vehicle body, enables the waterproof cover 8 to be firmly fixed to realize a structure that is excellent in shockproof properties to counter vehicle oscillations.

With the waterproof cover 8 formed of the plastic resin member 83 insert molded with the metallic members 82 to allow the metallic members 82 to be used for mounting the waterproof cover 8 onto the engine bracket 90 through the mount stays 43, 44, it becomes possible to prevent the plastic resin member of the mount stays 43, 44 from creeping, thereby enabling a realization of a structure that is excellent in shockproof properties to counter vehicle oscillations.

Although the present invention has been described with reference to the presently filed embodiment, no limitation is intended by the present invention and the present invention may be implemented in a variety of modifications or alterations within a scope of teaching of the present invention. While the presently filed embodiment has been described with reference to a structure wherein the cooling wind discharge windows 42, 46, formed in the front housing 41 and the rear housing 45, respectively, and the ventilation apertures 81 formed in the waterproof cover 8 are inclined in the same direction along the rotational direction of the rotor 3, these components may be inclined in opposite directions.

Figure 5:
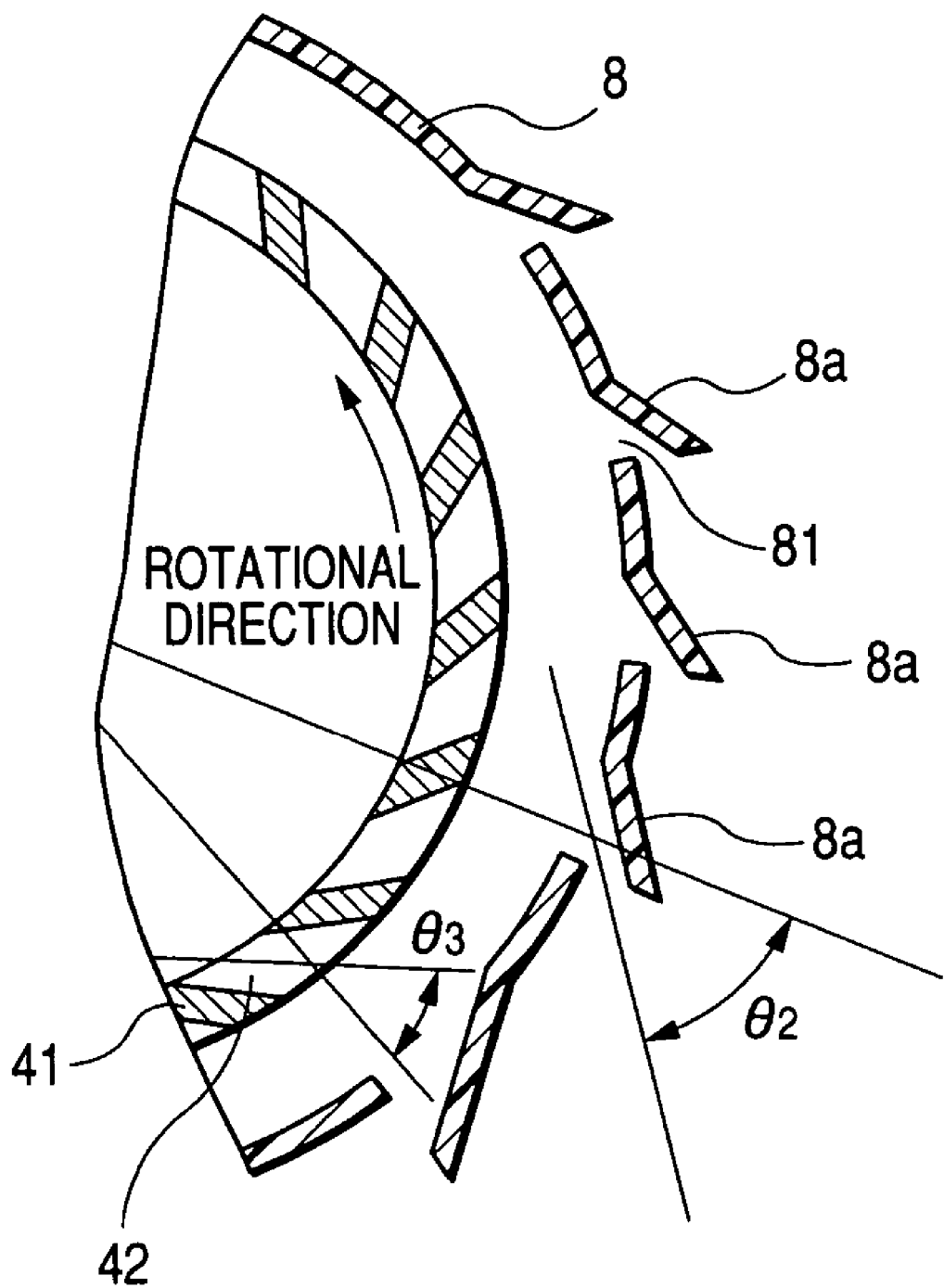
FIG. 5 is a partial cross sectional view illustrating a modified form of the vehicular alternator in which cooling wind discharge windows and ventilation apertures of the waterproof cover are oriented in opposite directions.

FIG. 5 is a partial cross sectional view illustrating a modified form in which the cooling wind discharge windows and the ventilation apertures 81, formed in the waterproof cover 8, are inclined in the opposite direction as set forth above. More particularly, the cooling wind discharge windows 42 (and, similarly, the cooling wind discharge windows 46 of the rear housing 45) of the front housing 41 are oriented at an inclined angle of $\theta 3$ in the same direction as the rotational direction of the rotor 3 with respect to the centrifugal direction. In contrast, the ventilation apertures 81 of the waterproof cover 8 are oriented at the inclined angle of $\theta 2$ in a direction opposite to the rotational direction with respect to the centrifugal direction. Thus, by setting any one of the inclinations, at which the ventilation apertures 81 are oriented, and the inclinations, at which the cooling wind discharge windows 42, 46 are oriented, to be aligned in the same direction as the rotational direction of the rotor 3 while setting the others to be oriented in a direction opposite to the rotational direction of the rotor 3, muddy water, penetrating along the inclined ventilation apertures 81 of the waterproof cover 8, can be forced to hit the outer peripheral surfaces of the front housing 41 and the rear housing 45 or side walls of the cooling wind discharge windows 42, 46. Thus, muddy water can be stopped from directly reaching the armature winding 21, making it possible to provide further improvements in the waterproof properties of the waterproof cover 8.

Further, while the presently filed embodiment has been set forth above in conjunction with the structure wherein the waterproof cover 8 is jointly fastened to the mount stays 43, 44 of the front housing 41 through the mount bolts 47, the waterproof cover 8 may be fastened to another area other than the mount stays 43, 44 using screws. Also, although the presently filed embodiment has been described in connection with the structure in which the waterproof cover 8 includes the metallic members 82 that are insert molded, it may be possible to use a waterproof cover that is made of a plastic resin member in cases where a vehicle is subjected to less oscillations. Or, it may be possible to employ a waterproof cover entirely formed of metallic material.

Furthermore, while the presently filed embodiment has been set forth above in conjunction with the structure wherein both the inclined angle of $\theta 3$, at which the cooling wind discharge windows 42, 46 are oriented, and the inclined angle of $\theta 2$, at which the ventilation apertures 81 of the waterproof cover 8 are oriented, are set to an angle of "0" degree, at least one of the cooling wind discharge windows 42, 46 and the ventilation apertures 81 may be formed in parallel (at the angle of $\theta 2=0°$ and at the angle of $\theta 3=0°$) to the centrifugal direction.

While the specific embodiment of the present invention has been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A vehicular alternator for use in a vehicle, comprising:
a stator on which an armature winding is wound;
a rotor rotatably disposed in the stator;
a cooling unit mounted to the rotor for creating cooling wind during rotation of the rotor;
a housing with which the stator and the rotor are supported and having a side area formed with a plurality of cooling wind discharge windows, oriented at a first inclined angle with respect to a centrifugal direction about an axis of a rotary shaft of the rotor, to discharge the cooling wind; and
a waterproof cover located over an outer circumferential periphery of the side area;
wherein the waterproof cover has a plurality of ventilation apertures formed at a second inclined angle different from the first inclined angle.

2. The vehicular alternator according to claim 1, wherein:
the ventilation apertures are inclined with respect to the centrifugal direction about the center of the rotary shaft of the rotor.

3. The vehicular alternator according to claim 1, wherein:
the cooling wind discharge windows are inclined with respect to the centrifugal direction about the center of the rotary shaft of the rotor.

4. The vehicular alternator according to claim 1, wherein:
at least one of the first and second inclined angles lies in the same direction as that of a rotational direction of the rotor and the other of the first and second inclined angles lies in a direction opposite to the rotational direction of the rotor.

5. The vehicular alternator according to claim 1, wherein:
the housing includes a vehicle mount section through which the waterproof cover is adapted to be fastened to the vehicle together with the housing.

6. The vehicular alternator according to claim 1, wherein:
the waterproof cover is formed of a plastic resin member with insert molded metallic members through which the waterproof cover is fastened to the vehicle.

7. The vehicular alternator according to claim 1, wherein:
each of the cooling wind discharge windows lies on a first direction and each of the ventilation apertures lies on a second direction; and
wherein the first and second directions lie at angles that are out of coincidence.

8. The vehicular alternator according to claim 1, wherein:
the housing includes a front housing and a rear housing concentric with the front housing; and
wherein the front housing and the rear housing have the cooling wind discharge windows oriented at the first inclined angle.

9. The vehicular alternator according to claim 8, wherein:
the front housing is formed with a mount section having mount stays on both sides of the mount section to allow the waterproof cover to be mounted to the vehicle together with the front housing.

10. The vehicular alternator according to claim 9, further comprising:
an engine bracket to which the waterproof cover is fastened through the mount stays of the front housing.

11. A vehicular alternator for use in a vehicle, comprising:
stator means on which a winding is wound;
a rotor rotatably disposed in the stator means;
cooling wind generating means for creating cooling wind during rotation of the rotor;
housing means with which the stator means and the rotor are supported and having a side area formed with a plurality of cooling wind discharge windows, oriented at a first inclined angle with respect to a centrifugal direction about an axis of a rotary shaft of the rotor, to discharge the cooling wind; and
a waterproof cover located over an outer circumferential periphery of the side area;
wherein the waterproof cover has a plurality of ventilation apertures formed at a second inclined angle different from the first inclined angle.

* * * * *